United States Patent
Lee et al.

(10) Patent No.: US 8,301,644 B2
(45) Date of Patent: Oct. 30, 2012

(54) APPARATUS AND METHOD OF DRIVING LOADABLE DEVICE COMPONENT

(75) Inventors: Chan Yong Lee, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 12/682,397

(22) PCT Filed: Oct. 10, 2008

(86) PCT No.: PCT/KR2008/005958
§ 371 (c)(1),
(2), (4) Date: Apr. 9, 2010

(87) PCT Pub. No.: WO2009/048285
PCT Pub. Date: Apr. 16, 2009

(65) Prior Publication Data
US 2010/0217786 A1     Aug. 26, 2010

(30) Foreign Application Priority Data
Oct. 11, 2007 (KR) .................. 10-2007-0102590
Jun. 23, 2008 (KR) .................. 10-2008-0059199

(51) Int. Cl.
  *G06F 17/30*         (2006.01)
(52) U.S. Cl. .................. 707/755; 707/771; 707/791
(58) Field of Classification Search .......... 707/802–803, 707/91–793
See application file for complete search history.

(56) References Cited

U.S. PATENT DOCUMENTS

| | | | |
|---|---|---|---|
| 2002/0103810 A1* | 8/2002 | Menachemi et al. | 707/102 |
| 2003/0055835 A1* | 3/2003 | Roth | 707/102 |
| 2003/0126202 A1* | 7/2003 | Watt | 709/203 |
| 2004/0255300 A1 | 12/2004 | Schechter et al. | |
| 2006/0031749 A1* | 2/2006 | Schramm et al. | 715/500.1 |
| 2006/0195473 A1* | 8/2006 | Lin et al. | 707/104.1 |
| 2007/0006203 A1* | 1/2007 | Marwinski | 717/166 |
| 2007/0061797 A1* | 3/2007 | Atsatt et al. | 717/166 |
| 2007/0088757 A1* | 4/2007 | Mullins et al. | 707/200 |
| 2007/0250608 A1* | 10/2007 | Watt | 709/222 |

FOREIGN PATENT DOCUMENTS

| | | |
|---|---|---|
| JP | 2005-84900 | 3/2005 |
| KR | 10-0499815 | 6/2005 |
| KR | 1020050055986 | 6/2005 |
| KR | 10-2006-0065970 | 6/2006 |

OTHER PUBLICATIONS

Kim, Saehwa et al., "SCA-based Component Framework for Software Defined Radio," Proceedings of the IEEE Workshop on Software Technologies for Future Embedded Systems, (2003).

* cited by examiner

*Primary Examiner* — Hanh Thai
(74) *Attorney, Agent, or Firm* — Nelson Mullins Riley & Scarborough LLP; EuiHoon Lee, Esq.

(57) ABSTRACT

An apparatus for driving a loadable device component, the apparatus including: the loadable device component providing an application with a loading mechanism that is classified according to a load type property; a core framework module component defining a kind of the load type property; at least one eXtensible Markup Language (XML) data component containing configuration information and generation information of the loadable device component; and a device manager component driving a corresponding loadable device component after parsing the XML data component.

15 Claims, 4 Drawing Sheets

Fig. 5

```
<?xml version="1.0" encoding="UTF-8"?>
(softpkg ..........>
  ...
  <implementation id = ...>
    <code type = "Executable" params=" EXECUTABLE_2">
       <localfile name="A">
    </ code>
    ...
  </ implementation>
< softpkg >
```

```
<?xml version="1.0" encoding="UTF-8"?>
(deviceconfiguration ..........>
  ...
  <componentfiles>
    <componentfile id="A" type="SPD">
       <localfile name="B">
    </ componentfile>
    ...
  </ componentfiles>
< deviceconfiguration >
```

600
610

APPARATUS AND METHOD OF DRIVING LOADABLE DEVICE COMPONENT

RELATED APPLICATIONS

This application is a 35 U.S.C. §371 national stage filing of PCT Application No. PCT/KR2008/005958 filed on Oct. 10, 2008, which claims priority to, and the benefit of, Korean Patent Application No. 10-2007-0102590 filed on Oct. 11, 2007 and Korean Patent Application No. 10-2008-0059199 filed on Jun. 23, 2008. The contents of the aforementioned applications are hereby incorporated by reference.

TECHNICAL FIELD

The present invention relates to a method and apparatus for driving a device component in a system with a software structure based on Software Communication Architecture (SCA) (hereinafter, referred to as an "SCA-based system"), and more particularly, to a method and apparatus for driving a loadable device component that can simplify and effectively manage a recyclable component when driving a loadable device component.

This work was supported by the IT R&D program of MIC/IITA. [2006-S-012-02, Development of Middleware Platform Technology based on the SDR Mobile Station]

BACKGROUND ART

A Software Communication Architecture (SCA)-based system provides loading of a corresponding system in a loadable device. The loadable device employs a mechanism that classifies, for each load type, an application file to be loaded in a particular file system and loads the classified application file.

In the case of the above scheme, if there is a device using the same load type but having a different loading mechanism, a scheme of inheriting a loadable device interface to thereby apply a loading mechanism for each device may need to be used in the current structure. Also, a different component may need to be constructed to perform an operation for each device.

Accordingly, when a plurality of loadable devices exists, a plurality of device components may exist to thereby use a large amount of resources. In view of a device manager, management of device components may be complex.

Also, since the device manager manages the plurality of device components, the plurality of device components may exist in Device Configuration Descriptor (DCD) eXtensible Markup Language (XML) data, which makes the management complex.

Also, since the device manager parses the plurality of device components, parsing time may be unnecessarily long.

In order to solve the above problems, there is a need for a method and apparatus for driving a loadable device component that can use a single device component where a plurality of loadable device interfaces is realized, instead of using a plurality of device components where the plurality of loadable device interface is realized, and thereby reduce a waste of resources and improve utilization of resources.

DISCLOSURE OF INVENTION

Technical Problem

An aspect of the present invention provides a method and apparatus for driving a loadable device component that can simplify and effectively manage a recyclable component when driving a loadable device component in a Software Communication Architecture (SCA)-based system. More particularly, an aspect of the present invention provides a method and apparatus for driving a loadable device component that can integrate device components of a device manager instead of managing the device components for each device and thereby reduce a waste of resources and improve utilization of resources.

Another aspect of the present invention also provides a method and apparatus for driving a loadable device component that can manage only a single device component in a device manager and thereby simplify a Device Configuration Descriptor (DCD) eXtensible Markup Language (XML) data structure.

Another aspect of the present invention also provides a method and apparatus for driving a loadable device component that enables a device manager to parse only a single device component and thereby reducing a parsing time.

Technical Solution

According to an aspect of the present invention, there is provided an apparatus for driving a loadable device component, the apparatus including: the loadable device component providing an application with a loading mechanism that is classified according to a load type property; a core framework module component defining a kind of the load type property; at least one eXtensible Markup Language (XML) data component containing configuration information and generation information of the loadable device component; and a device manager component driving a corresponding loadable device component after parsing the XML data component.

In this instance, the loadable device component may include: a device interface providing a mechanism that allocates a capacity to a device or deallocates a capacity from the device; a loadable device interface inheriting the device interface to provide a mechanism that loads the application in a particular device; and a class inheriting the loadable device interface to realize the loadable device component.

According to another aspect of the present invention, there is provided a driving a device manager component; defining, by a core framework module component, a kind of a load type property; parsing, by the device manager component, at least one XML data component that contains configuration information and generation information of the loadable device component providing a loading mechanism that is classified according to the load type property; and driving, by the device manager component, a corresponding loadable device component according to the parsing result.

According to still another aspect of the present invention, there is provided a method of using a loadable device component, the method including: driving a device manager component; parsing, by the device manager component, at least one XML data component that contains configuration information and generation information of the loadable device component providing a loading mechanism that is classified according to a load type property; driving, by the device manager component, a corresponding loadable device component according to the parsing result; selecting, by an application, the driven loadable device component; searching for, by the application, the load type property that is realized by the selected loadable device component; and executing a loading mechanism corresponding to the retrieved load type property.

Advantageous Effects

According to the present invention, there is provided a method and apparatus for driving a loadable device component that can simplify and effectively manage a recyclable component when driving a loadable device component in a Software Communication Architecture (SCA)-based system. Therefore, it is possible to integrate device components of a device manager instead of managing the device components for each device and thereby reduce a waste of resources and improve utilization of resources.

Also, according to the present invention, it is possible to manage only a single device component in a device manager and thereby simplify a Device Configuration Descriptor (DCD) eXtensible Markup Language (XML) data structure.

Also, according to the present invention, it is possible to enable a device manager to parse only a single device component and thereby reducing a parsing time.

BRIEF DESCRIPTION OF THE DRAWINGS

FIG. 5 illustrates the structure of a Software Package Descriptor (SPD) eXtensible Markup Language (XML) data component according to an embodiment of the present invention;

FIG. 6 illustrates the structure of a Device Configuration Descriptor (DCD) XML data component according to an embodiment of the present invention;

MODE FOR THE INVENTION

Figure 1:
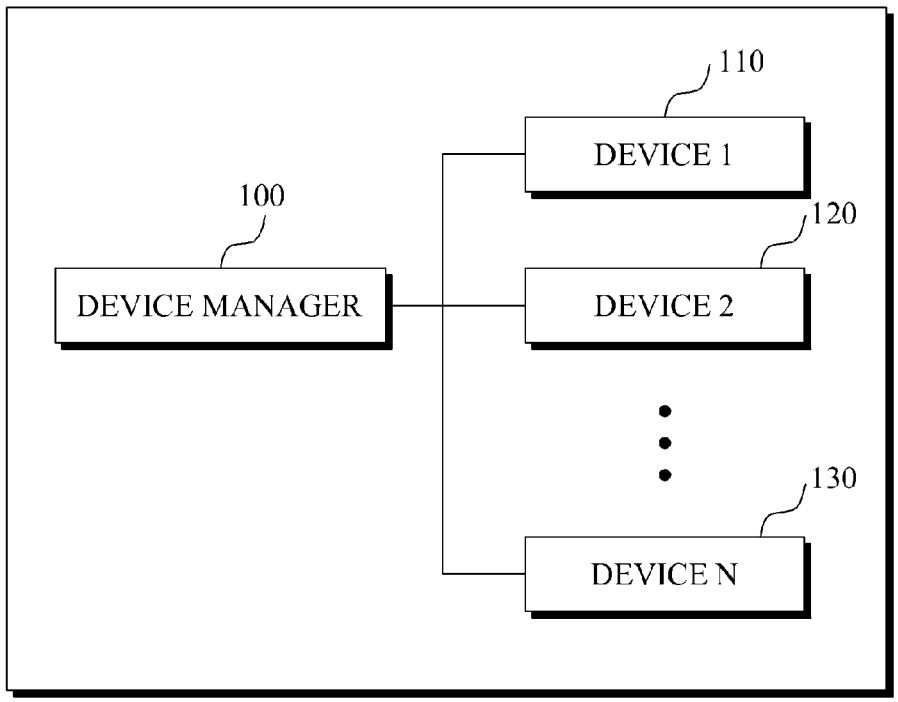
FIG. 1 is a block diagram for describing a device operation in a device manager according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram for describing a device operation in a device manager 100 according to an embodiment of the present invention.

Referring to FIG. 1, the device manager 100 functions to drive and manage a plurality of devices 110, 120, and 130. The plurality of devices 110, 120, and 130 may perform a loadable operation, an executable operation, or an aggregate operation.

A device performing the loadable act may provide a mechanism that loads or unloads software in a particular device. A modem or a Field Programmable Gate Array (FPGA) device corresponds to a loadable device.

A device performing the executable act may provide a mechanism that drives and executes software in the particular device. A digital signal processor (DSP) device or a general purpose processor (GPP) device corresponds to an executable device.

A device performing the aggregate act may provide a mechanism that associates a device with another device or disassociates the device with the other device. A multi-channel device corresponds to an aggregate device.

The devices 110, 120, and 130 performing the above acts may provide logic device capability information and status information.

Specifically, the device manager 100 may parse the devices 110, 120, and 130 defined in a Device Configuration Descriptor (DCD) eXtensible Markup Language (XML) 600 as shown in FIG. 6 to thereby load or drive the devices 110, 120, and 130. Next, the devices 110, 120, and 130 may register to the device manager 100 informing that that the devices 110, 120, and 130 are driven. The device manager 100 may receive the above event and perform a function of initiating the devices 110, 120, and 130.

Figure 2:
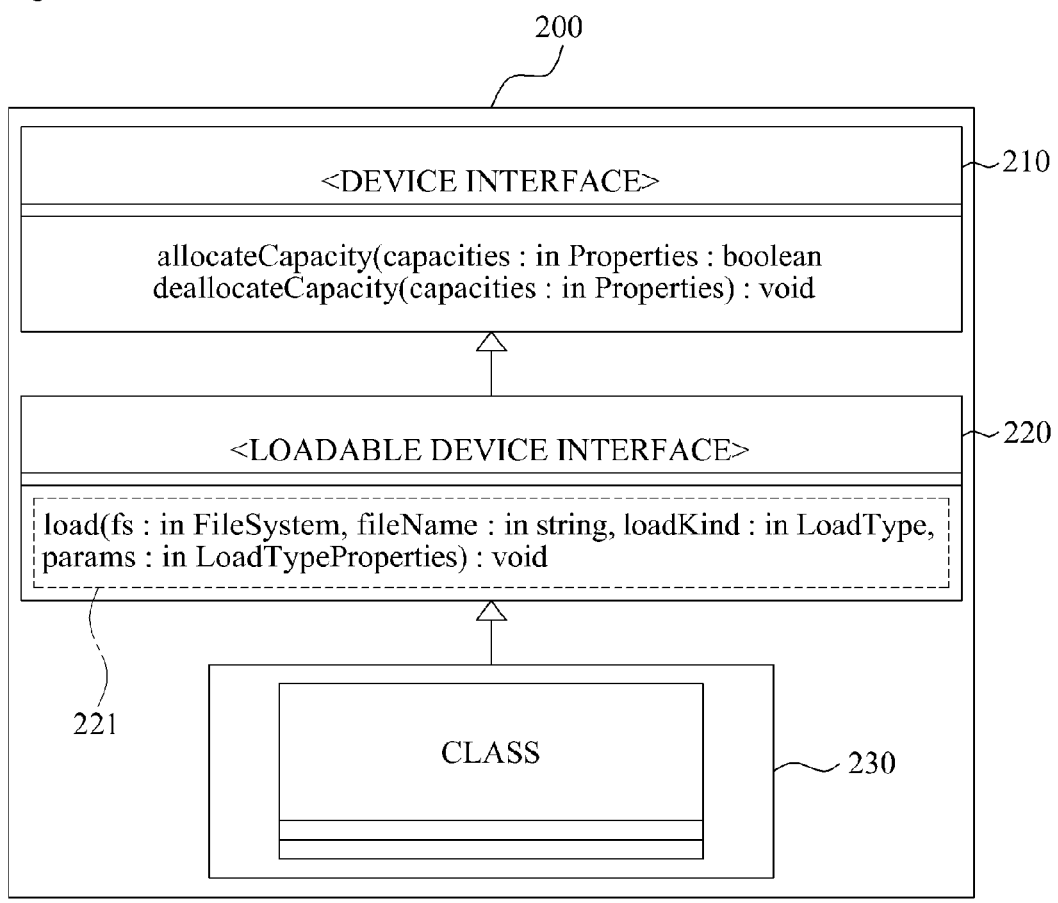
FIG. 2 is a block diagram illustrating a loadable device component according to an embodiment of the present invention.

FIG. 2 is a block diagram illustrating a loadable device component 200 according to an embodiment of the present invention.

Referring to FIG. 2, the loadable device component 200 may include a device interface 210 providing a mechanism that allocates a capacity (allocateCapacity) to a device or deallocates the capacity (deallocateCapacity) from device, a loadable device interface 220 inheriting the device interface 210 to provide a mechanism that loads an application in a particular device, and a class 230 inheriting the loadable device interface 220 to realize the loadable device component 200.

A load operation 221 of the loadable device interface 220 may use a mechanism that classifies, for each load type (loadkind: in LoadType), an application file (filename: in string) to be loaded in a particular file system (fs: in FileSystem) and loads the classified application file.

Also, the load operation 221 includes a parameter (params: in LoadTypeProperties) for classifying the same kind of load types. Accordingly, although a device with a different loading mechanism exists, there is no need to inherit the loadable device interface 220 and apply a loading mechanism for each device. Also, there is no need to construct a separate loadable device component for each device.

As described above, according to an aspect of the present invention, although a plurality of loading mechanisms exists, only the single loadable device component 200 may be required. Therefore, it is possible to effectively use resources and to simplify the management of the loadable device component 200 in a device manager.

When the load operation 221 does not include the parameter (params: in LoadType-Properties) for classifying the same kind of load types and in this instance, a device using the same kind of load type but having a different loading mechanism exists, a scheme of inheriting the loadable device interface 220 to thereby apply a loading mechanism for each device may need to be used. Also, a separate component may need to be constructed to perform an operation for each device.

Accordingly, when the plurality of loading mechanisms exists, a plurality of loadable device components may exist to thereby consume a large amount of resources. Also, the management of the loadable device components in a device manager may become complex.

Figure 3:
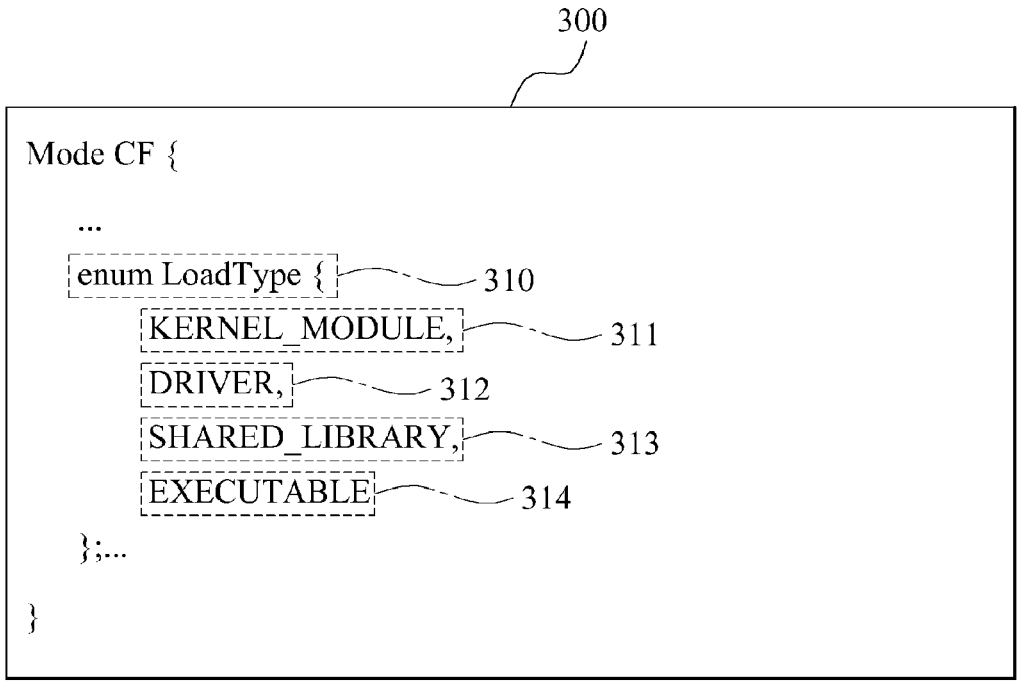
FIG. 3 illustrates the structure of a load type in a core framework module according to an embodiment of the represent invention.

FIG. 3 illustrates the structure of a load type in a core framework module 300 according to an embodiment of the represent invention. Hereinafter, the load type will be described with reference to FIG. 3.

Referring to FIG. 3, the core framework module 300 includes an enum element that defines a kind of the load type. A load type (LoadType) 310 of the enum element may include a kernel module (KERNEL_MODULE) 311 for loading a kernel, a driver (DRIVER) 312 for loading a driver, a shared library (SHARED_LIBRARY) 313 for loading a library, and an executable unit (EXECUTABLE) 314 for loading a process.

Figure 4:
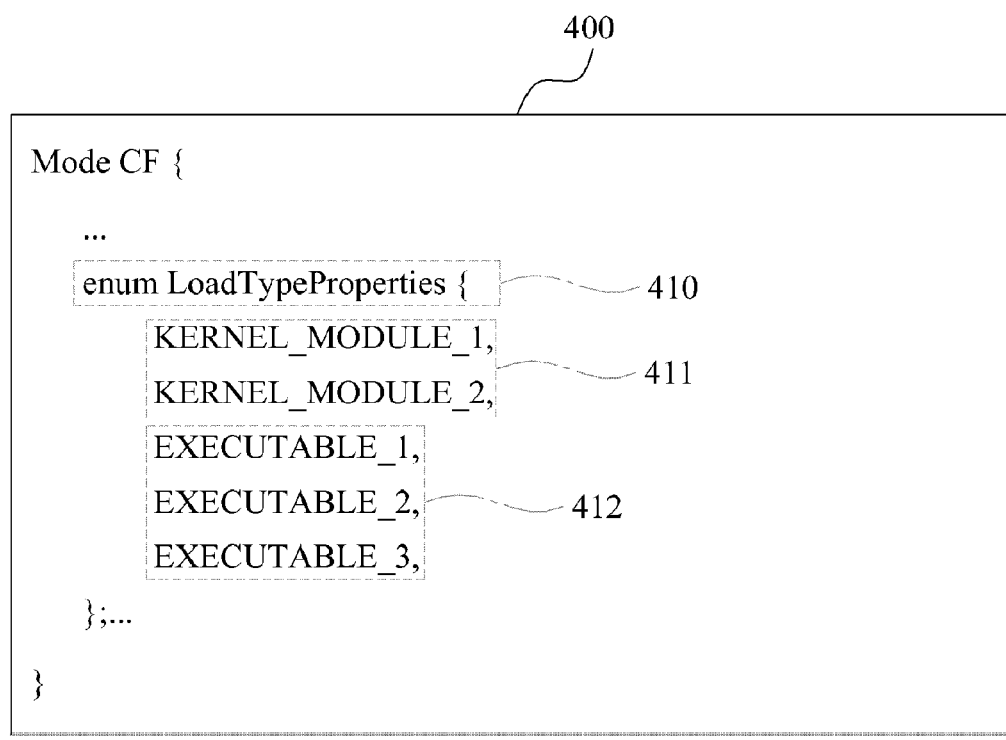
FIG. 4 illustrates the structure of a load type property in a core framework module according to an embodiment of the present invention.

FIG. 4 illustrates the structure of a load type property in a core framework module 400 according to an embodiment of the present invention. Hereinafter, the load type property will be described with reference to FIG. 4.

Referring to FIG. 4, the core framework module 400 includes an enum element 410 that defines a kind of the load type property. Accordingly, it is possible to classify a component with a different loading mechanism but the same load type. Also, when a single loadable device component exists regardless of a plurality of loading mechanisms, it is possible to clearly classify a loading mechanism.

FIG. 4 illustrates an example where a kernel module 411 includes two loading mechanisms having the same road type but a different loading mechanism, KERNEL_MODULE_1 and KERNEL_MODULE_2, and an executable unit 412 includes three loading mechanisms, EXECUTABLE_1, EXECUTABLE_2, and EXECUTABLE_3.

FIG. 5 illustrates the structure of a Software Package Descriptor (SPD) eXtensible Markup Language (XML) data component 500 according to an embodiment of the present invention. Hereinafter, a load type property will be described with reference to FIG. 5.

Generally, in an SCA-based system, an XML data component may contain various types of information such as device setting information, device component configuration information, and the like, that are required to generate a device. Examples of the XML data component may include a DCM XML data component DCD.xml, an SPD XML data component SPD.xml, a Software component Descriptor (SCD) XML data component SCD.xml, and the like.

An apparatus for driving a loadable device according to an embodiment of the present invention may include at least one XML data component.

The at least one XML data component may include the SPD XML data component 500 and the DCD XML data component 600.

In this instance, the device manager component 100 may parse the DCD XML data component 600 and then parse the SPD XML data component 500 to thereby drive the corresponding loadable device component 200.

Referring to FIG. 5, a type property of a code element 510 may define a file 520 to be loaded in the SPD XML data component 500. In this instance, the load type (LoadType) of FIG. 3 may be defined in the type property of the code element 510. The load type property (LoadTypeProperties) of FIG. 4 may be defined in a parameter property.

A value of the type property may use a value that is defined in the core framework module 300 of FIG. 3. The kernel module (KERNEL_MODULE) 311 may use "KernelModule". The driver (DRIVER) 312 may use "Driver". The shared library (SHARED_LIBRARY) 313 may use "SharedLibrary". The executable unit (EXECUTABLE) 314 may use "Executable".

When the code element 510 defining a file 520 to be loaded in the SPD XML data component 500 uses only the type property, there is no way for classifying a component that has the same load type but a different loading mechanism.

In addition to the type property, the SPD XML data component 500 may include the parameter property of FIG. 4 in the code element 510 to thereby branch to a corresponding loading mechanism and perform a process in the single loadable device component 200.

FIG. 6 illustrates the structure of the DCD XML data component 600 according to an embodiment of the present invention. Hereinafter, a device parsing in the device manager 100 will be described.

Referring to FIG. 6, in order to drive a device, the device manager 100 may parse the DCD XML data component 600 using an XML parser.

If a parameter property does not exist in the enum element 410 that defines the kind of the load type property in the core framework module 400 and in the code element 510 of the SPD XML data component 500, a plurality of device components of the same load type may exist, requiring a plurality of component file elements 610. Accordingly, the file format of the DCD XML data component 600 may become complex and a relatively long parsing time may be required.

According to an aspect of the present invention, since the parameter property exists in the enum element 410 that defines the kind of the load type property in the core framework module 400 and in the code element 510 of the SPD data component 500, the file format of the DCD XML data component 600 may be simplified and the parsing time may be reduced.

Figure 7:
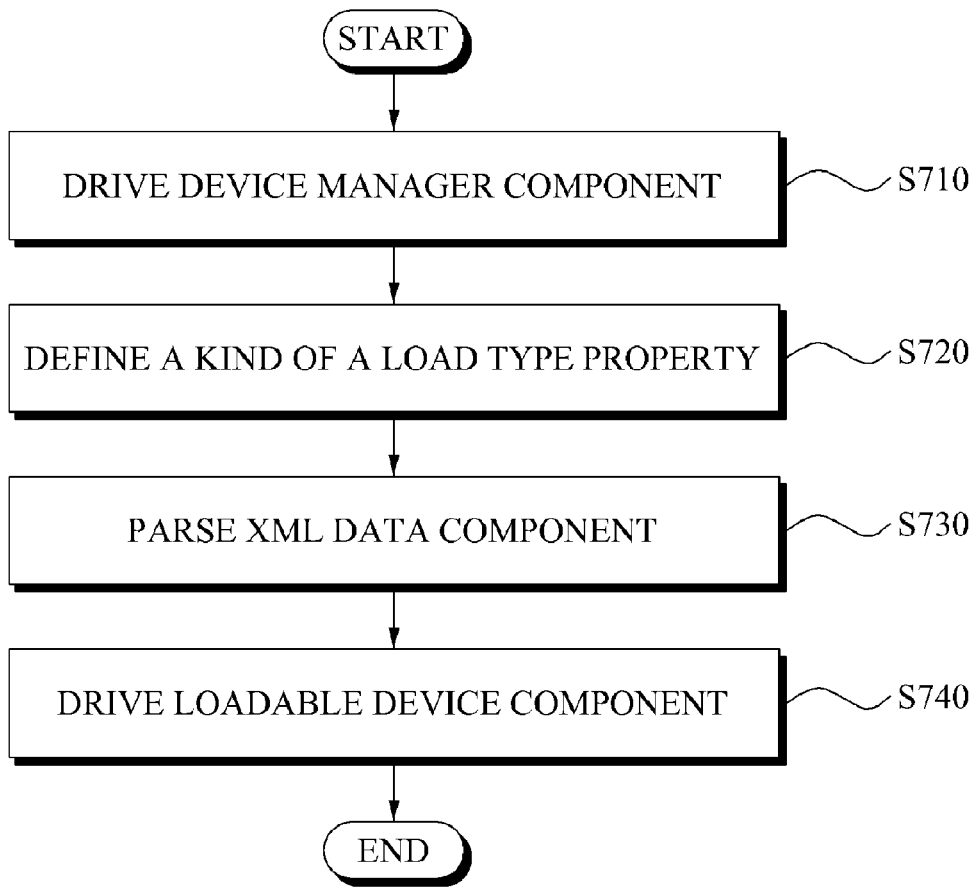
FIG. 7 is a flowchart illustrating a method of driving a loadable device component according to an embodiment of the present invention.

FIG. 7 is a flowchart illustrating a method of driving a loadable device component according to an embodiment of the present invention.

Referring to FIG. 7, the method of driving the loadable device component may include operation S710 of driving a device manager component, operation S720 of defining, by a core framework module component, a kind of a load type property operation S730 of parsing, by the device manager component, at least one XML data component containing configuration information and generation information of the loadable device component providing a loading mechanism that is classified according to a load type property, and operation S740 of driving, by the device manager component, a corresponding loadable device component according to the parsing result.

In operation S710, the device manager component may be driven by a batch system, a graphic user interface (GUI), or a user.

In operation S720, the core framework module component may define a kind of a load type property In operation S730, the device manager component may parse, using an XML parser, at least one XML data component containing the configuration information and generation information of the loadable device component.

In this instance, the at least one XML data component may include the SPD XML data component 500 and the DCD XML data component 600.

Also, the device manager component may parse the DCD XML data component 600 and then parse the SPD data XML data component 500.

In operation S740, the device manager component may drive a corresponding loadable device component according to the parsing result.

Figure 8:
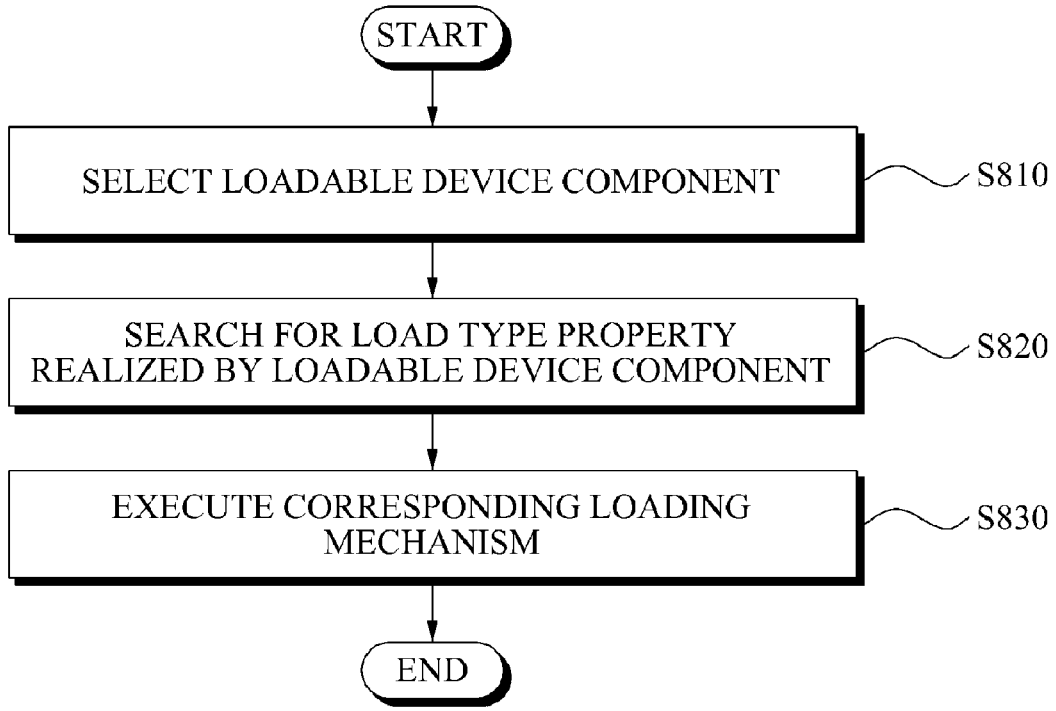
FIG. 8 is a flowchart illustrating a method of using a loadable device component in an application according to an embodiment of the present invention.

FIG. 8 is a flowchart illustrating a method of using a loadable device component in an application according to an embodiment of the present invention.

Referring to FIG. 8, the method of using the loadable device component in the application may include operation S810 of selecting, by the application, the driven loadable device component, operation S820 of searching for, by the application, the load type property that is realized by the selected loadable device component, and operation S830 of executing a loading mechanism corresponding to the retrieved load type property.

In operation S810, the application to be loaded in a particular device may select the loadable device component driven in operation S730 of FIG. 7.

In operation S820, the application may search for load type property information that is realized by the selected loadable device component.

In operation S830, a loading mechanism corresponding to the retrieved load type property may be executed whereby the application may be loaded in the particular device according to the executed loading mechanism.

The loadable device component driving and using method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. An apparatus for driving a loadable device component, the apparatus comprising a processor configured to execute:
   the loadable device component providing an application with a loading mechanism that is classified according to a load type property;
   a core framework module component defining a kind of the load type property;
   at least one eXtensible Markup Language (XML) data component containing configuration information and generation information of the loadable device component; and
   a device manager component driving a corresponding loadable device component in a Software Communication Architecture (SCA)-based system after parsing the XML data component,
   wherein the loadable device component includes a parameter for classifying the same kind of load types so that only a single loadable device component is required for covering devices with different loading mechanisms.

2. The apparatus of claim 1, wherein the loadable device component comprises:
   a device interface providing a mechanism that allocates a capacity to a device or deallocates a capacity from the device;
   a loadable device interface inheriting the device interface to provide a mechanism that loads the application in a particular device; and
   a class inheriting the loadable device interface to realize the loadable device component.

3. The apparatus of claim 2, wherein the loadable device interface includes a parameter that defines the load type property in a load operation.

4. The apparatus of claim 1, wherein the core framework module component includes an enum element that defines the kind of the load type property.

5. The apparatus of claim 1, wherein the at least one XML data component includes a Software Package Descriptor (SPD) XML data component and a Device Configuration Descriptor (DCD) XML data component.

6. The apparatus of claim 5, wherein the SPD XML data component includes a parameter that indicates the load type property in a code element defining a file to be loaded.

7. The apparatus of claim 5, wherein the DCD XML data component includes only a single loadable device component file of the same load type.

8. A method of driving a loadable device component, the method comprising:
   driving, by a processor, a device manager component;
   defining, by a core framework module component, a kind of a load type property;
   parsing, by the device manager component, at least one XML data component that contains configuration information and generation information of the loadable device component providing a loading mechanism that is classified according to the load type property; and
   driving, by the device manager component, a corresponding loadable device component in a Software Communication Architecture (SCA)-based system according to the parsing result,
   wherein the loadable device component includes a parameter for classifying the same kind of load types so that only a single loadable device component is required for covering devices with different loading mechanisms.

9. The method of claim 8, wherein the loadable device component comprises:
   a device interface providing a mechanism that allocates a capacity to a device or deallocates a capacity from the device;
   a loadable device interface inheriting the device interface to provide a mechanism that loads the application in a particular device; and
   a class inheriting the loadable device interface to realize the loadable device component.

10. The method of claim 9, wherein the loadable device interface includes a parameter that defines the load type property in a load operation.

11. The method of claim 8, wherein the core framework module component includes an enum element that defines the kind of the load type property.

12. The method of claim 8, wherein the parsing parses a DCD XML data component and then parses an SPD XML data component.

13. The method of claim 12, wherein the SPD XML data component includes a parameter that indicates the load type property in a code element defining a file to be loaded.

14. The method of claim 12, wherein the DCD XML data component includes only a single loadable device component file of the same load type.

15. A method of using a loadable device component, the method comprising:

driving, by a processor, a device manager component;

parsing, by the device manager component, at least one XML data component that contains configuration information and generation information of the loadable device component providing a loading mechanism that is classified according to a load type property;

driving, by the device manager component, a corresponding loadable device component in a Software Communication Architecture (SCA)-based system according to the parsing result;

selecting, by an application, the driven loadable device component;

searching for, by the application, the load type property that is realized by the selected loadable device component; and executing a loading mechanism corresponding to the retrieved load type property, wherein the loadable device component includes a parameter for classifying the same kind of load types so that only a single loadable device component is required for covering devices with different loading mechanisms.

* * * * *